United States Patent
Tokuyama et al.

(10) Patent No.: US 9,250,471 B2
(45) Date of Patent: Feb. 2, 2016

(54) LIQUID CRYSTAL DISPLAY DEVICE

(71) Applicant: Japan Display Inc., Tokyo (JP)

(72) Inventors: Hiroshi Tokuyama, Tokyo (JP); Norihiro Nakamura, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/047,089

(22) Filed: Oct. 7, 2013

(65) Prior Publication Data

US 2014/0098322 A1    Apr. 10, 2014

(30) Foreign Application Priority Data

Oct. 10, 2012   (JP) .................................. 2012-225090

(51) Int. Cl.
*G02F 1/1335* (2006.01)
*G02F 1/1333* (2006.01)
*F21V 8/00* (2006.01)

(52) U.S. Cl.
CPC .......... *G02F 1/133608* (2013.01); *G02B 6/009* (2013.01); *G02B 6/0068* (2013.01); *G02B 6/0073* (2013.01); *G02B 6/0085* (2013.01); *G02F 1/133603* (2013.01); *G02F 1/133615* (2013.01); *G02F 2001/133314* (2013.01); *G02F 2001/133628* (2013.01)

(58) Field of Classification Search
CPC combination set(s) only.
See application file for complete search history.

(56) References Cited

U.S. PATENT DOCUMENTS

| | | | |
|---|---|---|---|
| 8,253,886 B2 * | 8/2012 | Jeong et al. | 349/65 |
| 2005/0088586 A1 * | 4/2005 | Mori et al. | 349/62 |
| 2008/0204631 A1 | 8/2008 | Takada | |
| 2008/0284308 A1 * | 11/2008 | Pang | 313/498 |
| 2012/0092868 A1 * | 4/2012 | Block et al. | 362/249.01 |
| 2012/0105762 A1 * | 5/2012 | Que | 349/60 |
| 2012/0236598 A1 | 9/2012 | Germain et al. | |

FOREIGN PATENT DOCUMENTS

| | | |
|---|---|---|
| CN | 100378541 C | 4/2008 |
| CN | 101201148 A | 6/2008 |
| JP | 2008-216406 | 9/2008 |
| JP | 2010-122330 | 6/2010 |
| KR | 10-2008-0042023 | 5/2008 |
| WO | 2012125605 A2 | 9/2012 |

OTHER PUBLICATIONS

Office Action in corresponding European Patent Application 13187733.4, mailed Jan. 3, 2014.

(Continued)

*Primary Examiner* — Wen-Ying P Chen
(74) *Attorney, Agent, or Firm* — Lowe Hauptman & Ham, LLP

(57) ABSTRACT

A liquid crystal display device includes a light source, a light source circuit board on which the light source is mounted, and which electrically controls the light source, a light guide plate optical system including a light guide plate having an incidence plane from which a light emitted from the light source is input, and outputting the light as a planar light, and a frame that holds the light guide plate optical system and the light source circuit board, and has a hole at a position of a light source arrangement plane which faces the incidence plane in which the light source is arranged. The light source circuit board is located at the frame so that the light source is arranged inside the hole from a rear surface side of the light source arrangement plane.

8 Claims, 10 Drawing Sheets

(56) References Cited

OTHER PUBLICATIONS

Partial English translation of Office Action for Korean Patent Application No. 10-2013-119279, dated Oct. 17, 2014.

Office Action issued by Chinese Patent Office on Oct. 26, 2015 regarding a counterpart Chinese patent application No. 201310466885.X.

* cited by examiner

LIQUID CRYSTAL DISPLAY DEVICE

CROSS-REFERENCE TO RELATED APPLICATION

The present application claims priority from Japanese application JP2012-225090 filed on Oct. 10, 2012, the content of which is hereby incorporated by reference into this application.

BACKGROUND OF THE INVENTION

1. Field of the Invention

The present invention relates to a liquid crystal display device.

2. Description of the Related Art

As display devices for an information communication terminal such as a computer or a television receiver, liquid crystal display devices have been extensively employed. The liquid crystal display device is designed to change an orientation of a liquid crystal composition encapsulated between two substrates according to a change in an electric field, and control the degree of transparency of a light that passes through those two substrates and the liquid crystal composition to display an image.

In the liquid crystal display device of this type, it is general to use an illuminating device called "backlight" as a light source. As an illuminating system of the backlight, there have been mainly known a direct light system having the light source on a rear side of a liquid crystal display surface, and a side light system that reflects a light emitted from a side to illuminate the liquid crystal display surface. In the liquid crystal display device used for mobile communication terminal devices such as cellular phones in recent years, since downsizing and power saving are demanded, the side light systems having light emitting diodes (LED) as a light source are increasingly used.

JP 2008-216406 A discloses a radiator plate that radiates a heat generated by light emission of the LEDs in the liquid crystal display device of the side light system.

SUMMARY OF THE INVENTION

In recent years, the liquid crystal display device used particularly in the mobile terminals is demanded to be further downsized and thinned, and even in the liquid crystal display device of the side light system using the LEDs, a frame area formed around a display area is demanded to be reduced.

The present invention has been made in view of the above circumstances, and an object of the present invention is to provide a liquid crystal display device using the backlight of the side light system which reduces the frame area.

According to the present invention, there is provided a liquid crystal display device, including: a light source; a light source circuit board on which the light source is mounted, and which electrically controls the light source; a light guide plate optical system including a light guide plate having an incidence plane from which a light emitted from the light source is input, and outputting the light as a planar light; and a frame that holds the light guide plate optical system and the light source circuit board, and has a hole at a position of a light source arrangement plane which faces the incidence plane in which the light source is arranged, in which the light source circuit board is located at the frame so that the light source is arranged inside the hole from a rear surface side of the light source arrangement plane.

Also, in the liquid crystal display device according to the present invention, a thickness of the frame on the light source arrangement plane may be determined according to a height of the light source from the light source circuit board.

Further, in the liquid crystal display device according to the present invention, the hole of the frame may be formed into a tapered shape widened toward the light guide plate optical system.

Further, the liquid crystal display device according to the present invention includes a plurality of light sources, and one hole may be formed for each of the light sources, or one hole may be formed for the plurality of light sources.

Further, in the liquid crystal display device according to the present invention, the light source circuit board and the frame may contact directly or indirectly with each other on respective surfaces so as to conduct the heat generated from the light source, and if the light source circuit board and the frame contact indirectly with each other, those members may contact with each other through a resin containing a glass filler.

Further, in the liquid crystal display device according to the present invention, a reflection sheet may be arranged on the light source arrangement plane of the frame.

DETAILED DESCRIPTION OF THE INVENTION

Figure 9:
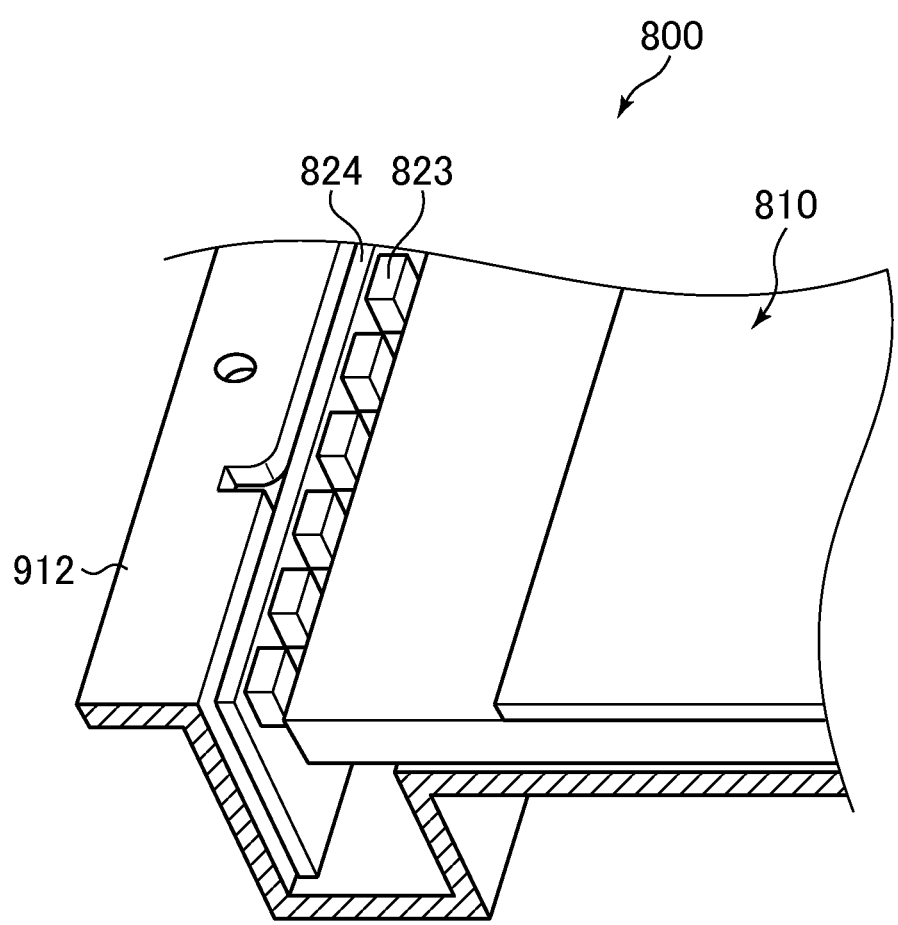
FIG. 9 is a cross-sectional perspective view illustrating a part of a backlight module and a frame in the liquid crystal display device according to a comparative example of the present invention.

First, a structure of a comparative example of the present invention will be described. FIG. 9 is a cross-sectional perspective view illustrating a part of a backlight module 800 and a frame 912 in which the backlight module 800 is installed in a liquid crystal display device using LED light sources of a side light system according to a comparative example of the present invention. As illustrated in FIG. 9, the backlight module 800 includes a light guide plate optical system 810 including a light guide plate, an optical sheet such as a diffusion sheet, and a reflection sheet, LEDs (light emitting diodes) 823 which are light sources, and a light source control board 824 that has the LEDs 823 mounted thereon, and controls light emission of the LEDs 823. Also, the light guide plate optical system 810 and the light source control board 824 are installed in the frame 912 so as to input a light emitted by the LEDs 823 from a side surface of the light guide plate.

Figure 10:
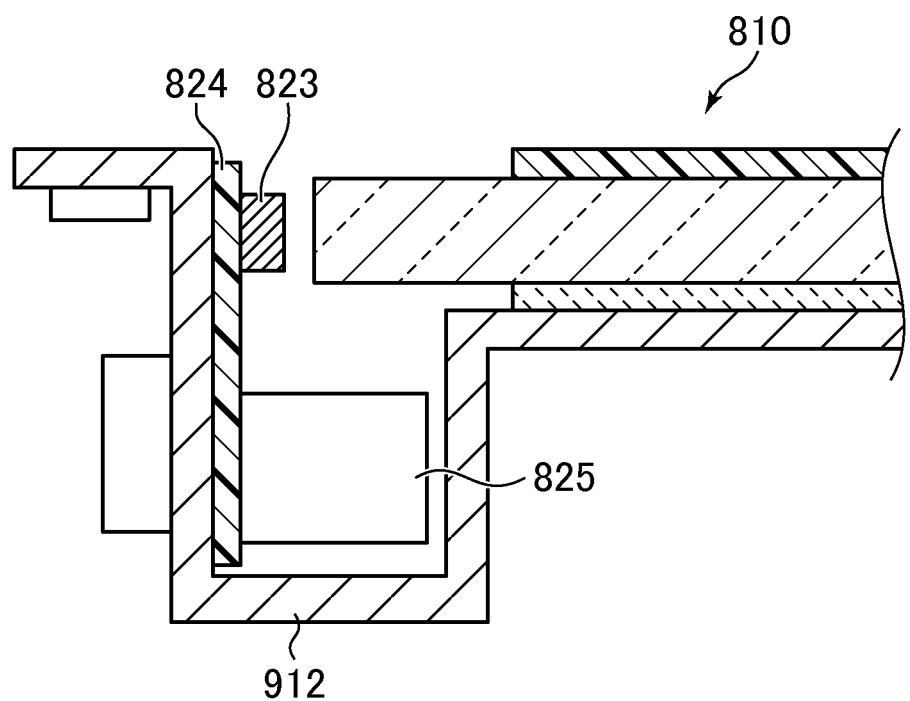
FIG. 10 is a cross-sectional view taken along a side surface of the backlight module and the frame in FIG. 9.

FIG. 10 is a cross-sectional view taken along a side surface of the backlight module 800 and the frame 912 in FIG. 9. As illustrated in FIG. 10, since the light source control board 824 is longer than a thickness of the light guide plate optical system 810 in a direction of the thickness, and a connector 825 that receives a control signal for controlling the LEDs 823, or the like, is placed on the light source control board 824, the frame 912 is formed into a U-shape which comes around in a direction away from a bottom surface of the light guide plate optical system 810. Also, in this comparative example, because the light source control board 824 and the LEDs 823 are arranged between the incidence plane of the light guide plate optical system 810 and the frame 912, a frame area as large as thicknesses of the light source control board 824 and the LEDs 823 is required.

Hereinafter, an embodiment of the present invention will be described with reference to the accompanying drawings. In the drawings, the same or equivalent elements are denoted by identical reference numerals or symbols, and a repetitive description will be omitted.

Figure 1:
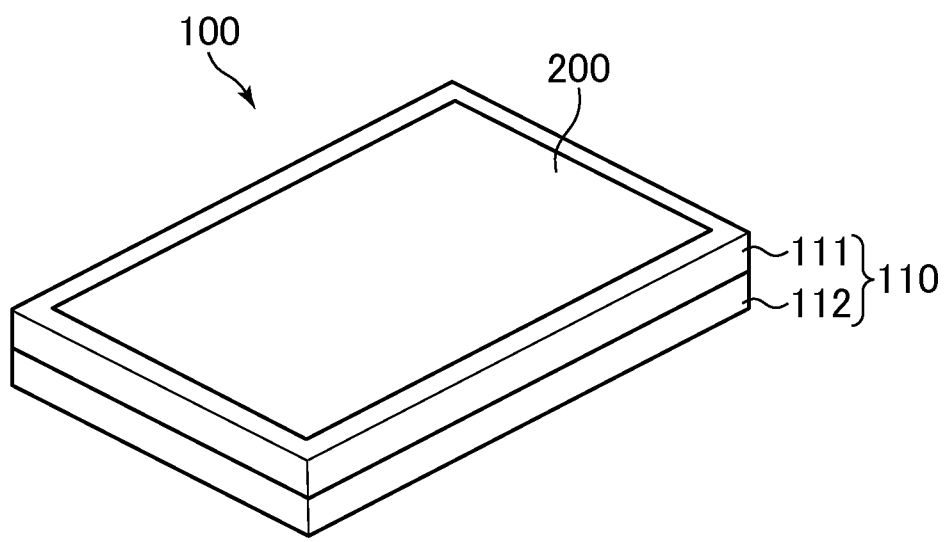
FIG. 1 is a diagram schematically illustrating a liquid crystal display device according to an embodiment of the present invention.

FIG. 1 is a diagram schematically illustrating a liquid crystal display device 100 according to the embodiment of the present invention. As illustrated in FIG. 1, the liquid crystal display device 100 includes a liquid crystal module 200 that controls the transmission of a light output from a light guide plate optical system 210 to be described later by an orientation of liquid crystal sealed between two substrates, and a frame 110 that fixes the liquid crystal module 200. In this example, the frame 110 has an upper frame 111 on a display surface side, and a lower frame 112 on the light guide plate optical system 210 side. In this embodiment, the upper frame 111 and the lower frame 112 are formed of respective different components, but may be integrated into one frame.

Figure 2:
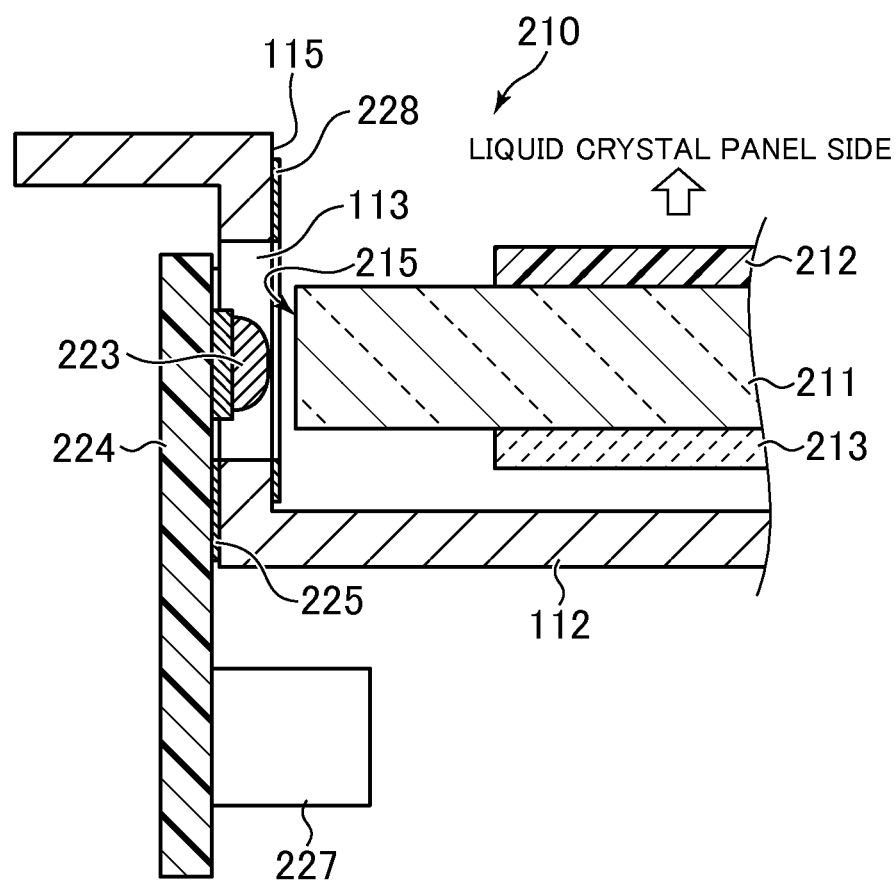
FIG. 2 is a cross-sectional view of a part of a lower frame side in FIG. 1.

FIG. 2 is a cross-sectional view illustrating a part of the lower frame 112 side in FIG. 1. As illustrated in FIG. 2, the light guide plate optical system 210 includes a light guide plate 211, an optical sheet 212 that is fitted to the liquid crystal panel side of the light guide plate 211, and formed of a prism sheet or a diffusion sheet, and a reflection sheet 213 that is fitted to an opposite side of the light guide plate 211. The light guide plate optical system 210 is fixed to the lower frame 112. With the above configuration of the light guide plate optical system 210, the light input from an incidence surface 215 of the light guide plate 211 is changed into a uniform planar light, and output to the liquid crystal panel side.

An LED 223 which is a light source is placed on a light source control substrate 224, and fixed to the lower frame 112 from a rear surface side of a light source arrangement plane 115 so as to be arranged in a hole 113 formed in the light source arrangement plane 115 of the lower frame 112 which is a surface facing the incidence surface 215 of the light guide plate 211. The light output from the LED 223 enters the light guide plate 211 from the incidence surface 215 of the light guide plate 211, and is repetitively reflected on upper and lower surfaces, and output from the light guide plate optical system 210 toward the liquid crystal panel side as the planar light. In this case, there is a risk that if the light output from the LED 223 is reflected on an inner wall surface of the hole 113, the reflected light affects the uniformity of the planar outgoing light. Therefore, the thickness of the light source arrangement plane 115 is designed so that the light is not reflected on the inner wall surface of the hole 113. That is, the thickness of the light source arrangement plane 115 is determined according to a height of the LED 223 or a divergence angle of the outgoing light.

The light source control substrate 224 is fixed in contact with the surface of the lower frame 112 for the purpose of enhancing the radiation of a heat generated by the LED 223. In particular, in this embodiment, a heat conductive member 225 is sandwiched between the light source control substrate 224 and the lower frame 112 to enhance the heat conductivity. In this case, the heat conductive member can be made of, for example, resin containing glass filler. Further, in order to return the light output from the incidence surface 215 of the light guide plate 211 to the interior of the light guide plate 211, a reflection sheet 228 is installed on the light source arrangement plane 115. The LED 223 as well as various electronic components including a connector 227 are placed on the light source control substrate 224.

Figure 3:
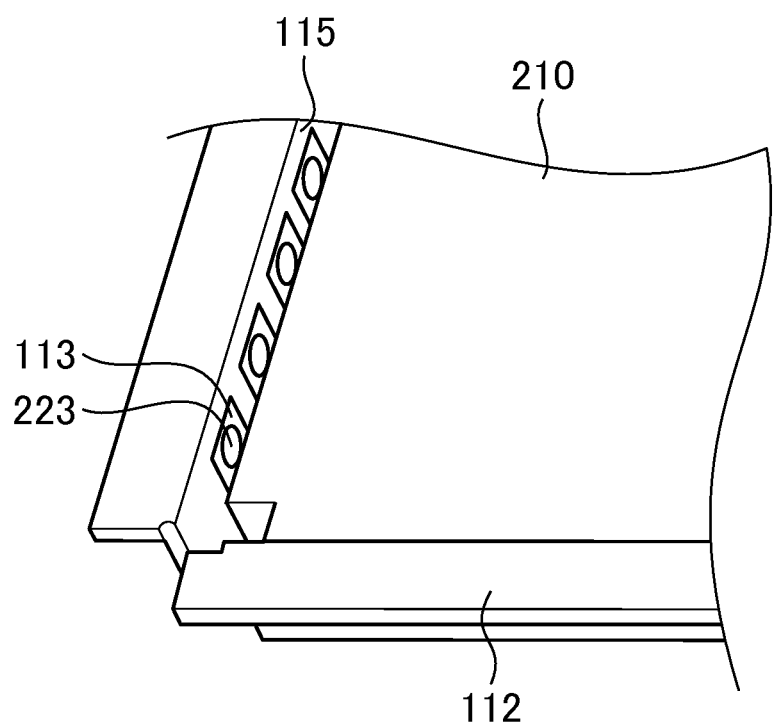
FIG. 3 is a perspective view of the part of the lower frame side in FIG. 1.

FIG. 3 is a perspective view of a part of the light guide plate optical system 210, the lower frame 112, and the LED 223 including a portion of the cross-sectional view of FIG. 2. As illustrated in FIG. 3, the light guide plate optical system 210 is arranged within the lower frame 112, and a plurality of LEDs 223 are arranged in a plurality of corresponding holes 113 opened in the light source arrangement plane 115. The lights output from the respective LEDs 223 are input to the incidence surface 215 of the light guide plate 211 illustrated in FIG. 2.

Figure 4:
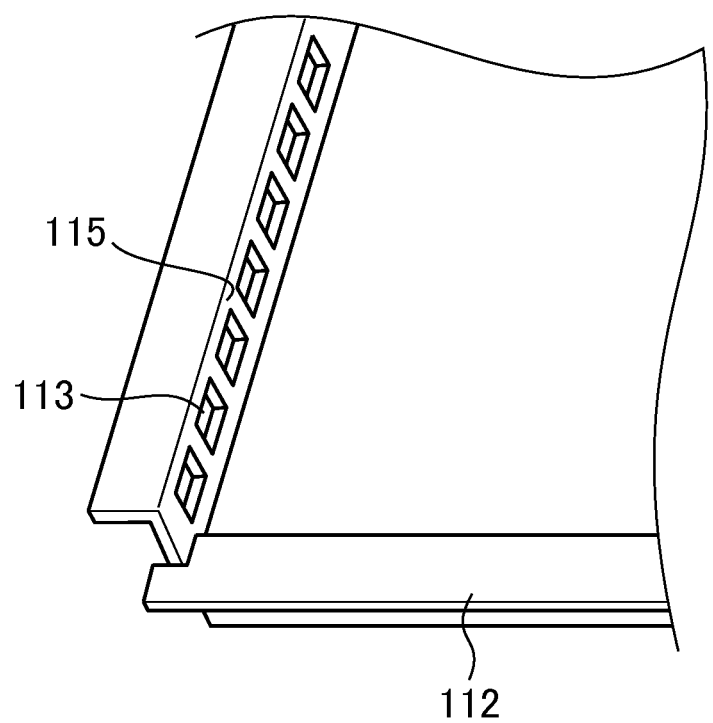
FIG. 4 is a diagram illustrating a plurality of holes opened in a light source arrangement plane of the lower frame in the same viewing field as that of FIG. 3.

FIG. 4 is a diagram illustrating a plurality of holes 113 opened in the light source arrangement plane 115 of the lower frame 112 in the same viewing field as that of FIG. 3. In this embodiment, the same number of holes 113 as that of the LEDs 223 are opened.

Therefore, according to the configuration of this embodiment, a clearance for the light source control substrate 224 and the LEDs 223 is not required between the frame 110 and the light guide plate optical system 210, and a side surface (light source arrangement plane 115) of the frame 110 can be brought closer to the light guide plate optical system 210 with the result that the frame area can be reduced. Also, because the frame 110 does not need to be formed into a U-shape that covers the light source control substrate 224, the frame 110 can be thinned.

Also, since the number of bends of the frame 110 is reduced to simplify the shape of the frame 110, processing costs including mold costs can be suppressed. Also, the number of occurrence of defective processed products can be reduced, and a yield can be improved. Also, because the LEDs 223 which are the light sources can be replaced with fresh ones without detaching the frame, it is possible to more easily deal with repair or defects during manufacturing.

Figure 5:
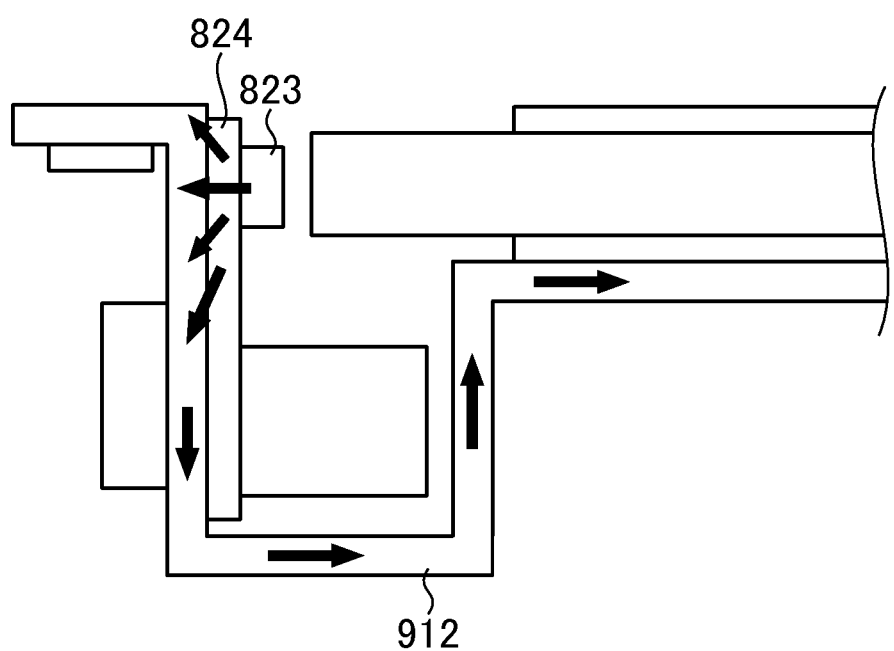
FIG. 5 is a diagram illustrating a situation in which a heat generated by an LED is conducted in a configuration illustrated in FIG. 10.

FIG. 5 is a diagram illustrating a path along which the heats generated by the LEDs 823 are conducted in the configuration illustrated in FIG. 10. As illustrated in FIG. 5, the heat generated in the LEDs 823 is propagated to the frame 912 made of metal high in the heat conductivity through the light source control board 824, and propagated in a direction more away from the LEDs 823 along the frame 912, thereby being radiated. In this situation, because the frame 912 is formed into the U-shape, the heat remains inside this shape, and the heat is not efficiently radiated in the U-shaped portion.

Figure 6:
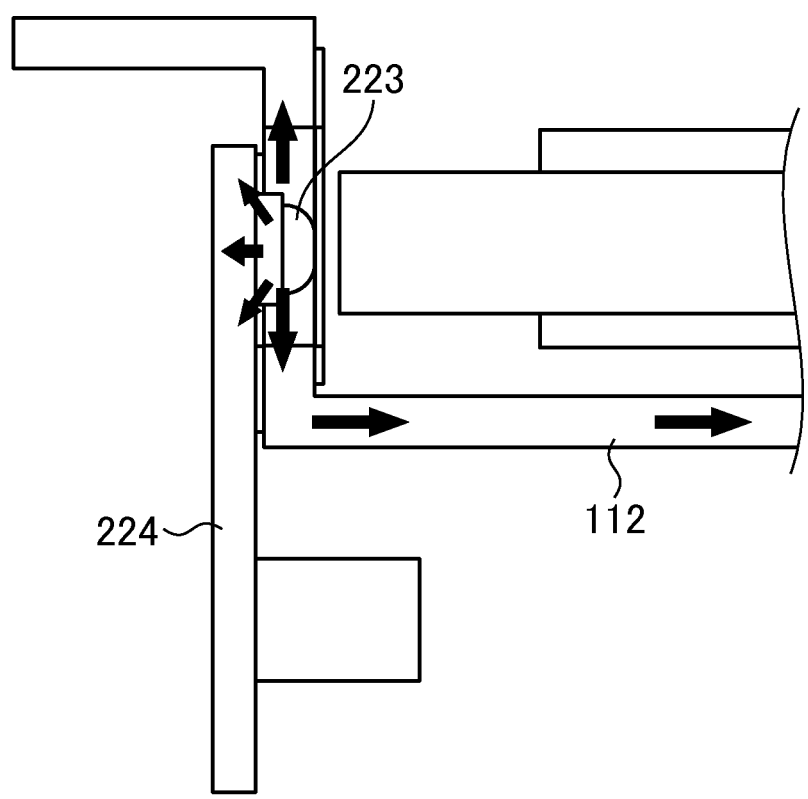
FIG. 6 is a diagram illustrating a situation in which a heat generated by an LED is conducted in a configuration illustrated in FIG. 2.

FIG. 6 is a diagram illustrating a path along which the heat generated by the LEDs 223 is propagated in the configuration illustrated in FIG. 2 according to the present invention. As illustrated in FIG. 6, the heat generated by the LEDs 223 is propagated to the light source control substrate 224 as in FIG. 5, and also propagated directly to the lower frame 112 made of metal. As a result, the heat of the LEDs 223 which are the heat sources can be efficiently radiated. Also, the lower frame 112 to which the heat is propagated is not formed into the U-shape in FIG. 5, but has a shape bent only once. Therefore, the heat can be propagated and radiated to a position more away from the LEDs 223. Accordingly, in the configuration of this embodiment, the heat can be propagated in more directions from the LEDs 223, and the propagated heat is efficiently radiated.

Accordingly, in the liquid crystal display device 100 according to this embodiment, because the heat is radiated from the light sources in more directions, and the heat is radiated directly to the frame 110 of metal large in radiation effect, the heat generated by the light source can be efficiently radiated. Further, because the number of bends of the frame 110 in the vicinity of the light sources is small, the heat can be more efficiently radiated without remaining in the vicinity of the light sources. In this way, because the deterioration in the light sources is suppressed with the enhancement of the radiation efficiency, an expected lifetime of the liquid crystal display device can be more lengthened.

Figure 7:
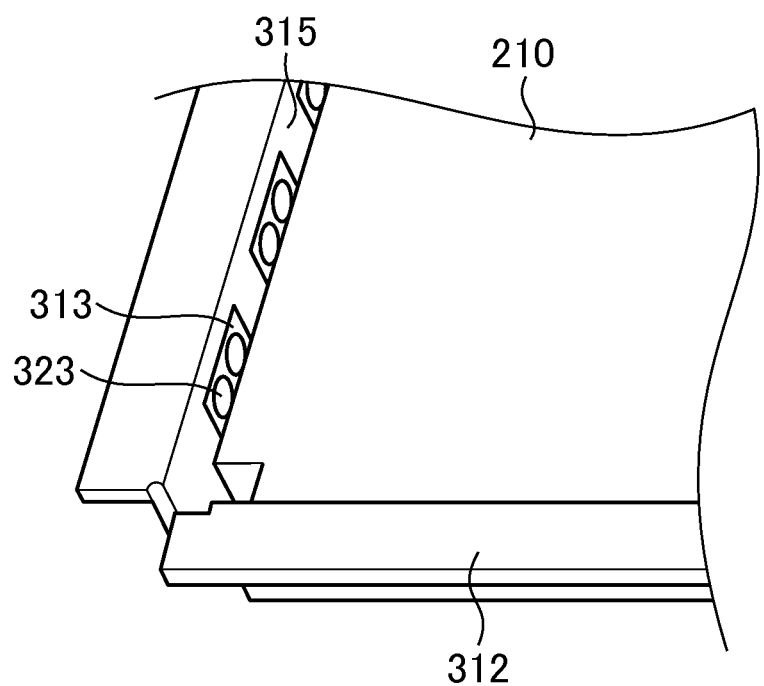
FIG. 7 is a diagram illustrating a first modified example of this embodiment.

FIG. 7 illustrates a first modified example of the above-mentioned embodiment. In this modified example, a frame 312 has one hole 313 for two LEDs 323 in a light source arrangement plane 315. In this modified example, two LEDs 323 are provided in one hole, but one hole may be used for three or more light sources. The number of light sources for one hole may be determined according to a size of the light sources, or a thickness or strength of the frame 312, or may be determined for an optical design reason, or other reasons.

Figure 8:
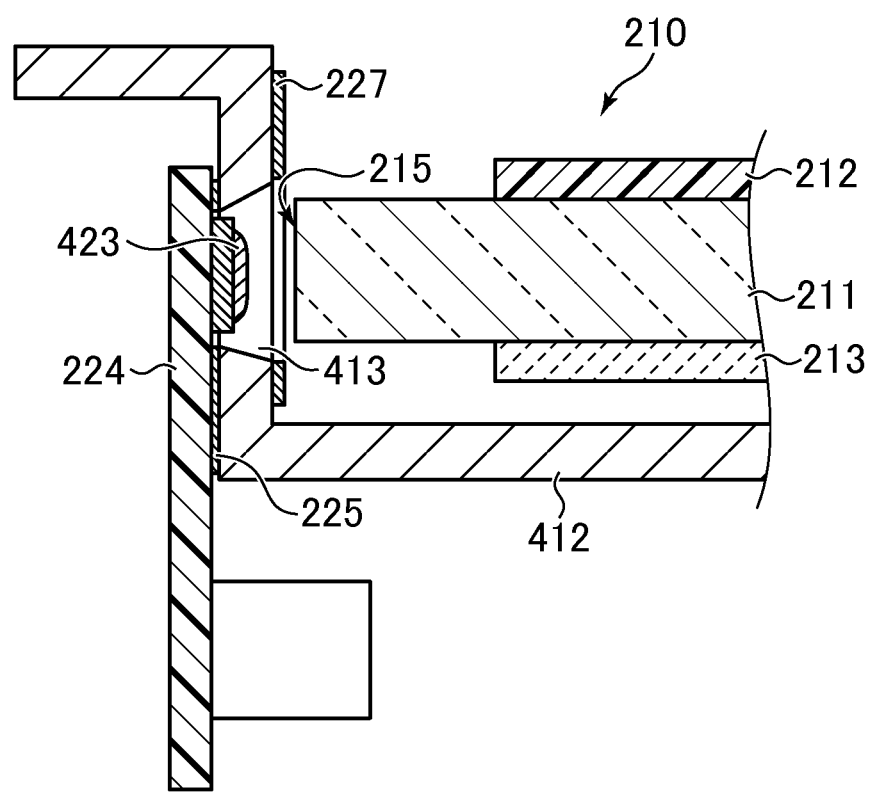
FIG. 8 is a diagram illustrating a second modified example of this embodiment.

FIG. 8 illustrates a second modified example of the above-mentioned embodiment. Referring to FIG. 2, the thickness of the light source arrangement plane 115 is determined according to the height of the LED 223, or the divergence angle of the outgoing light. On the other hand, as illustrated in FIG. 8, a hole 413 of the second modified example is formed into a tapered shape widened toward the light guide plate optical system 210. With the hole 413 thus shaped, when an LED 423 which is a thin light source is particularly used, the light output from the LED 423 can be prevented from being reflected on an inner wall surface of the hole 413 while maintaining the thickness of a frame 412 to keep the strength.

In the above-mentioned embodiment, the frame is divided into the upper frame and the lower frame. Alternatively, even when the upper frame and the lower frame are integrated together to hold both of the liquid crystal panel and the backlight module, if the light sources are arranged inside the hole from the rear surface side of the light source arrangement plane of the frame, the present invention can be applied to this configuration. Also, in the above-mentioned embodiment, the light sources are formed of the LEDs, but may be formed of other self-luminous light emitting elements.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising:
   a light source;
   a light source circuit board on which the light source is mounted, and which electrically controls the light source;
   a light guide plate optical system including a light guide plate having an incidence plane from which a light emitted from the light source is input, and outputting the light as a planar light;
   a frame that holds the light guide plate optical system and the light source circuit board, and has a hole at a position of a light source arrangement plane which faces the incidence plane in which the light source is arranged; and
   an electronic component positioned under the frame, the electronic component being mounted on the light source circuit board,
   wherein the light source circuit board is located at the frame so that the light source is arranged inside the hole from a rear surface side of the light source arrangement plane,
   the frame has a bottom under the light guide plate,
   the electronic component is positioned under the bottom of the frame, and
   the light source circuit board extends to a position lower than the bottom of the frame.

2. The liquid crystal display device according to claim 1, wherein a thickness of the frame on the light source arrangement plane is determined according to a height of the light source from the light source circuit board.

3. The liquid crystal display device according to claim 1, wherein the hole of the frame is formed into a tapered shape widened toward the light guide plate optical system.

4. The liquid crystal display device according to claim 1, wherein the light source comprises a plurality of light sources, the hole comprises a plurality of holes, and each of the holes is formed for each of the light sources.

5. The liquid crystal display device according to claim 1, wherein the device comprises a plurality of light sources, and the hole is formed for the plurality of light sources.

6. The liquid crystal display device according to claim 1, wherein the light source circuit board and the frame contact directly or indirectly with each other on respective surfaces so as to conduct the heat generated from the light source.

7. The liquid crystal display device according to claim 6, wherein the light source circuit board and the frame contact with each other through a resin containing a glass filler.

8. The liquid crystal display device according to claim 1, wherein a reflection sheet is arranged on the light source arrangement plane of the frame.

* * * * *